United States Patent [19]

Aoshima et al.

[11] Patent Number: 4,866,721
[45] Date of Patent: Sep. 12, 1989

[54] PULSED LASER STABILIZING DEVICE

[75] Inventors: Shinichiro Aoshima; Takuya Nakamura; Yutaka Tsuchiya, all of Shizuoka, Japan

[73] Assignee: Hamamatsu Photonics Kabushiki Kaisha, Shizuoka, Japan

[21] Appl. No.: 246,601

[22] Filed: Sep. 20, 1988

[30] Foreign Application Priority Data

Sep. 21, 1987 [JP] Japan ................. 62-236654

[51] Int. Cl.$^4$ .............................................. H01S 3/13
[52] U.S. Cl. ..................................... 372/30; 372/700; 372/38; 372/26
[58] Field of Search ............... 372/25, 27, 26, 29, 372/38, 700, 30

[56] References Cited

U.S. PATENT DOCUMENTS

| 4,412,331 | 10/1983 | Chapman | 372/29 |
| 4,516,242 | 5/1985 | Yokota | 372/29 |
| 4,663,760 | 5/1987 | Shimada et al. | 372/38 |
| 4,685,107 | 8/1987 | Kafka | 372/27 |
| 4,737,958 | 4/1988 | Sizer, II | 378/25 |
| 4,744,087 | 5/1988 | Nicia | 372/38 |

FOREIGN PATENT DOCUMENTS 1038140  8/1966 United Kingdom .
2187882A 9/1987 United Kingdom .

OTHER PUBLICATIONS

U.S. patent application Ser. No. 07/203,118, (Aoshima et al.), filed Jun. 7, 1988.

Primary Examiner—Léon Scott, Jr.
Attorney, Agent, or Firm—Finnegan, Henderson, Farabow, Garrett & Dunner

[57] ABSTRACT

A highly repetitively pulsed laser stabilizing device which comprises a laser resonator, a feedback system for optically delaying an optical pulse emitted from the laser resonator and returning it in such a manner that it is superposed on an optical pulse in the laser resonator, and a feedback system control section that monitors one of the optical pulses of the laser resonator and feedback system, and controls the optical path length of the feedback system so that the monitored optical pulse is optimum in intensity.

6 Claims, 4 Drawing Sheets

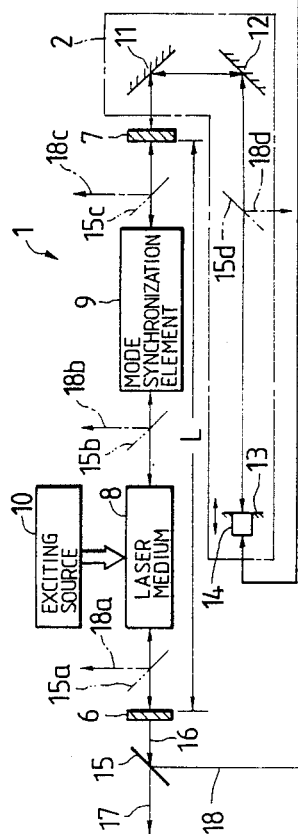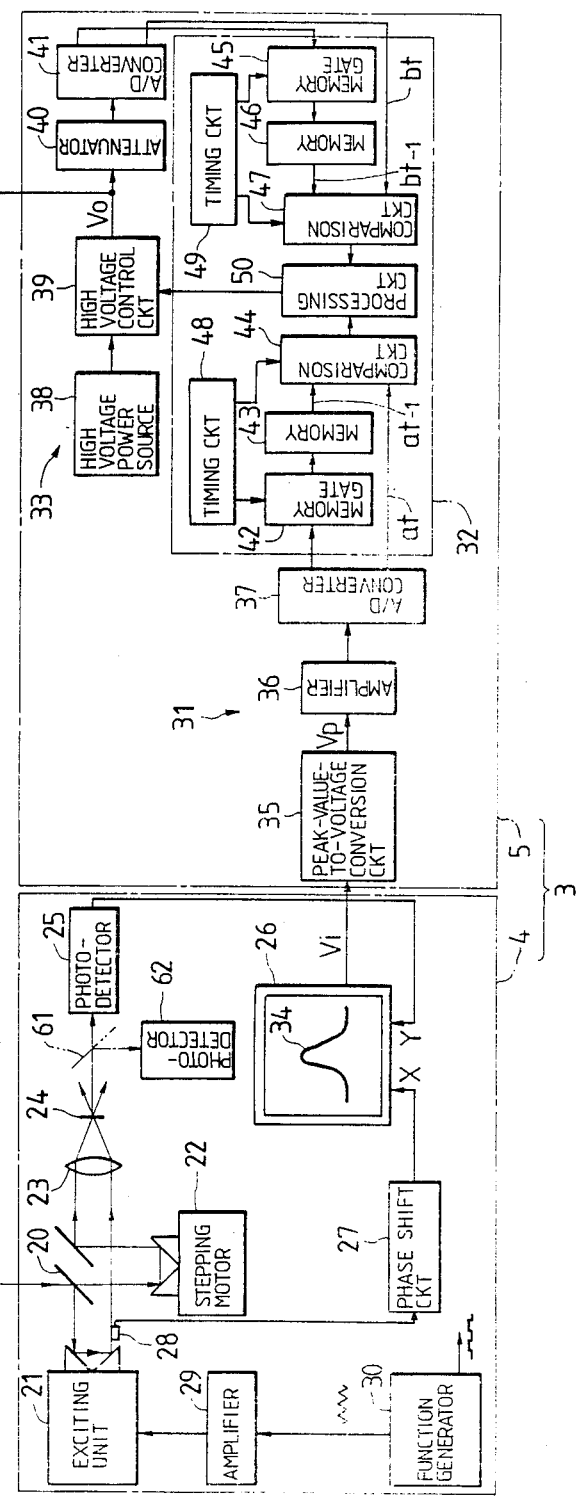
FIG. 1

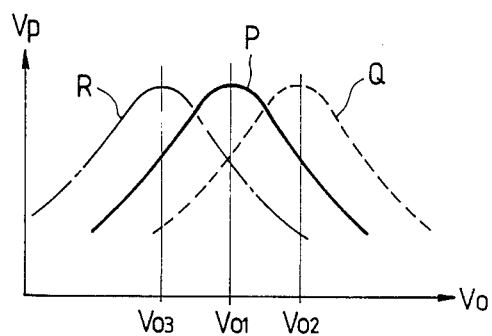
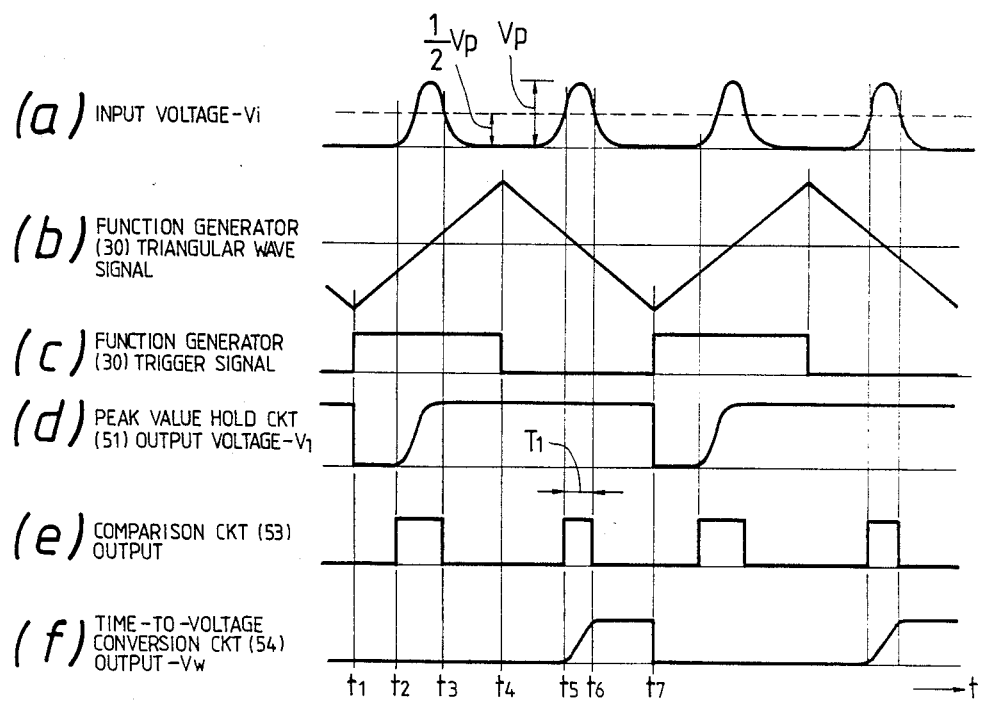

PULSED LASER STABILIZING DEVICE

BACKGROUND OF THE INVENTION

1. Field of the Invention:

This invention relates to lasers, and more particularly to a highly repetitively pulsed laser stabilizing device.

2. Description of the Prior Art

An active mode locking laser device in which an A-O element (acousto-optical element) is inserted in the laser resonator, and a passive mode locking laser device in which a saturable absorber such as dye solution is inserted in the laser resonator, are known in the art as examples of highly repetitively pulsed laser devices. However, both have shortcomings regarding the stabilization of the optical pulse output. In the active mode locking laser device, electrical control for stabilization of the ultrasonic strength of the A-O element is intricate. In the passive mode locking laser device, adjustment of the density of the saturable absorber such as dye solution with respect to the magnitude of excitation energy is complicated.

In order to solve the above-described problems, the present applicant has proposed a highly repetitively pulsed laser device in Japanese Patent Application No. 142262/1987, in which a feed-back system, simple both in construction and in adjustment, is provided for the laser resonator. When the optical pulse returning into the laser resonator and the optical pulse in the laser resonator are coincident, the output optical pulse is stable, short, and high in power when compared with that in the prior art.

However, the device is still disadvantageous in that when the laser resonator length changes, with ambient temperature for instance, an optical pulse returning into the laser resonator through the feedback system and an optical pulse in the laser resonator are shifted from each other in the timing of superposition. Therefore, the output optical pulse is shifted from its optimum value.

SUMMARY OF THE INVENTION

In view of the foregoing, an object of the present invention is to make the output optical pulse stable, short, and high in power.

Another object of the present invention is to maintain the excellent characteristics of the output optical pulse unchanged even when the laser resonator length is changed.

The foregoing and other objects of the present invention has been achieved by the provision of a highly repetitively pulsed laser stabililzing device which, according to the present invention, comprises a laser resonator, a feedback system for optically delaying an optical pulse emitted from the laser resonator and returning it into the laser resonator in such a manner that the delayed optical pulse is superposed on an optical pulse in the laser resonator, and a feedback system control section for monitoring one of the optical pulses of the laser resonator and feedback system, and controlling the optical path length of the feedback system so that the monitored optical pulse thus monitored is optimum in intensity.

BRIEF DESCRIPTION OF THE DRAWINGS

The accompanying drawings, which are incorporated in and constitute a part of the specification, illustrate embodiments of the present invention, and together with the description, serve to explain the principles of the invention.

FIG. 1 is a block diagram showing an arrangement of a first embodiment of a highly repetitively pulsed laser stabilizing device according to the present invention.

FIG. 2 is a graph showing the relationship between two voltage outputs shown in FIG. 1.

FIG. 4 is a time chart graphically showing various outputs of elements in the device shown in FIG. 3.

DESCRIPTION OF THE PREFERRED EMBODIMENTS

Figure 3:
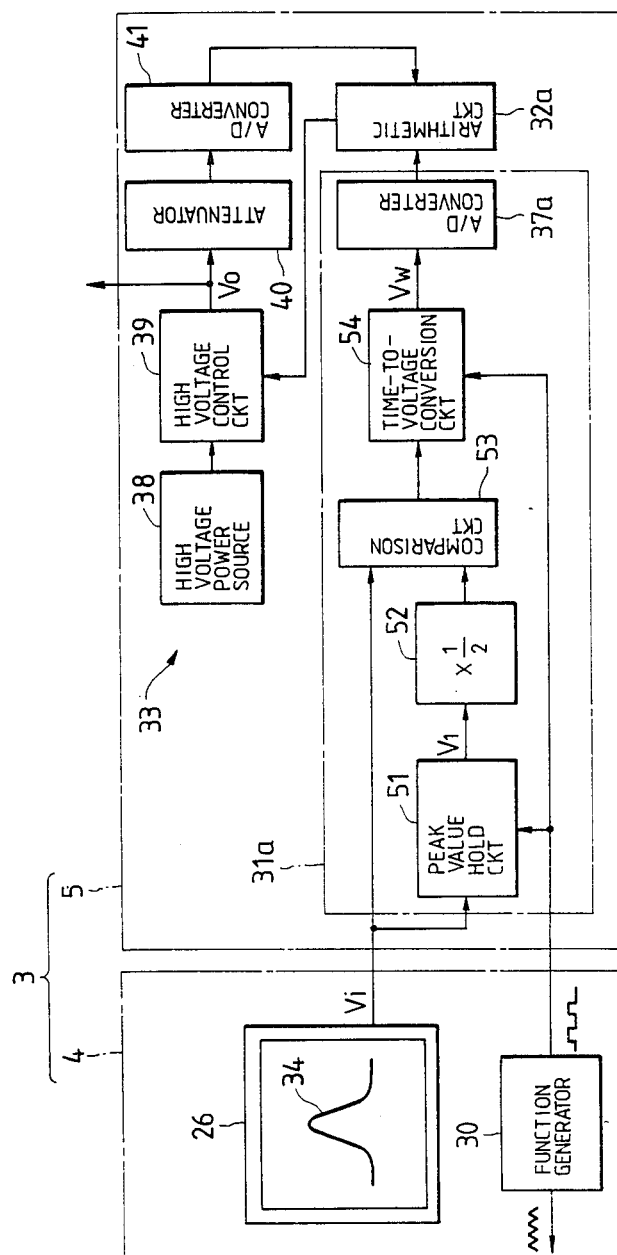
FIG. 3 is a block diagram showing an arrangement of a second embodiment of the highly repetitively pulsed laser stabilizing device according to the present invention.

FIG. 1 shows a first embodiment of the invention. Referring now to FIG. 1, reference numeral 1 designates a laser resonator having a resonator length of L, reference numeral 2 designates a feedback system, and reference numeral 3 designates a feedback system control section comprising an SHG (second harmonic generation) autocorrelation waveform measuring device 4 and a control circuit 5. The laser resonator 1 comprises an output mirror 6, a reflecting mirror 7 transmitting part of an optical pulse, a laser medium 8 of, for example, Rhodamine 6G disposed between the output mirror 6 and the reflecting mirror 7, a mode locking element 9 of saturable absorber such as dye solution or the like, and an exciting source 10 for exciting the laser medium 8. The feedback system 2 comprises total reflection mirrors 11, 12 and 13. The feedback system 2 is designed so that an optical pulse provided through the reflecting mirror 7 by the laser resonator 1 is delayed by a predetermined optical distance d, and is then returned through the reflecting mirror 7 so as to be superposed on the optical pulse in the laser resonator. In other words, the feedback system 2 is designed so that it meets the following equation:

$$d = 2 n L \text{ (where } n = 1, 2, 3 \ldots \text{).}$$

A piezo-electric element 14 is secured to the total reflection mirror 13 in the feedback system 2, in order to change the optical path length d.

Further in FIG. 1, reference numeral 15 designates a branching unit comprising a glass plate and a beam splitter (not shown). The branching unit 15 is designed so as to divide the output optical pulse 16 of the output mirror 6 into an optical pulse 17, and a monitor light beam 18.

As was described above, the branching unit 15 divides the output optical pulse 16 of the laser resonator 1, to obtain the monitor light beam 18. The invention is not limited to this arrangement, however. A branching unit 15a, 15b, or 15c may be disposed in the laser resonator 1, to obtain a monitor light beam 18a, 18b, or 18c. Alternatively, a branching unit 15d may be arranged in the feedback system 2, to obtain a monitor light beam 18d.

The SHG autocorrelation waveform measuring device 4 comprises a branching unit 20 for dividing the monitor light beam 18 provided by the branching unit 15 into two optical pulse, a vibrator 21 and a stepping motor 22 which optically delay the two optical pulses in a variable mode, and an SHG crystal 24 for generating the second harmonic according to the optical pulses which are superposed on each other by means of a condenser lens 23, after being processed by the vibrator 21 and the stepping motor 22. The SHG autocorrelation waveform measuring device 4 further comprises a photo-detector 25, such as a photo-multiplier, for converting the strength of the second harmonic produced by the SHG crystal 24 into an electrical signal, a monitorscope 26 that receives the output of the photo-detector 25 as the Y-axis input, a gap sensor 28 that converts the displacement of the vibrator 21 into an electrical signal, a phase shift circuit 27 through which the electrical signal is applied to become the X-axis input to the monitorscope 26, and a function generator 30 for supplying a drive signal (such as a 6 Hz triangular wave) through an amplifier 29 to the vibrator 21.

The control circuit 5 comprises an input circuit 31, an arithmetic circuit 32, and an output circuit 33. The input circuit 31 comprises a peak-value-to-voltage conversion circuit 35, which detects the peak value of a measured waveform 34 of the monitorscope 26 according to an input voltage Vi, and converts the peak value to a corresponding voltage value Vp, an amplifier 36, and an A/D (analog-to-digital) converter 37. The output circuit 33 comprises a high voltage power source 38, a high voltage control circuit 39 for controlling the output voltage Vo of the high voltage power source 38 according to a control signal provided by a processing circuit 50 (described later), and an attenuator 40 and an A/D converter 41 which are provided on the output side of the high voltage control circuit 39 in the stated order. The high voltage control circuit 39 provides an output voltage Vo to drive the piezo-electric element 14 of the above-described feedback system 2.

The arithmetic circuit 32 comprises a comparsion circuit 44 for comparison data $a_t$ outputted by the A/D converter 37 and the preceding data $a_{t-1}$ supplied through a memory gate 42 and a memory 43, a comparison circuit 47 for comparing data $b_t$ outputted by the A/D converter 41 and the preceding data $b_{t-1}$ supplied through a memory gate 45 and a memory 46, a processing circuit 50 for controlling the above-described high voltage control circuit 39 according to the outputs of the comparison circuits 44 and 47, a timing circuit 48 for controlling the memory gate 42 and the comparison circuit 44, and a timing circuit 49 for controlling the memory gate 45 and the comparison circuit 47. The arithmetic circuit 32 controls the output voltage Vo by providing a control signal to the high voltage control circuit 39. When the peak voltage Vp and/or the output voltage Vo changes, and the output voltage Vo is therefore shifted from the critical value with which the peak voltage Vp reaches its maximum value, the output voltage Vo is caused to approach the critical value.

The operation of the above-described embodiment will be described with reference to FIG. 2. The measurement of the waveform of the monitor light beam 18 in the SHG autocorrelation waveform measuring device 4 may be carried out with the optical delay by the stepping motor 22 fixed, and the optical delay by vibrator 21 varied. Alternatively, both the optical delay by the stepping motor 22 and the optical delay by the vibrator 21 may be fixed after being adjusted to be equal in relative distance.

The operation of the above first embodiment will first be described with respect to the case where the resonance length L of the laser resonator 1 is not changed. In this case, the optical delay distance (hereinafter referred to merely as "an optical path length," when applicable) d of the feedback system 2 satisfies the following equation:

$$d = 2nL \text{ (where } n = 1, 2, 3 \ldots \text{).}$$

Therefore, the optical pulse returning into the laser resonator 1 through the feedback system 2 and the optical pulse in the laser resonator 1 are coincident with each other in the timing of superposition. That is, the relation between Vo and Vp is as indicated by the solid line P in FIG. 2. The control circuit 5 converges the output voltage Vo to $V_{o1}$, and the peak voltage $V_p$ reaches the maximum value of the solid line P. Accordingly, the laser resonator 1 outputs an optical pulse 17, which is stable, short, and high-powered, when compared with a conventional laser resonator having no feedback system.

The operation of the first embodiment in the case where the resonator length L of the laser resonator 1 is changed with the ambient temperature or the like will now be described.

(a) In the case where the resonator length L is changed to $L \times \Delta L$, then the relation $d = 2nL$ is not established. For convenience of description, it is assumed that when the optical path length d becomes $(d \times \Delta d)$, the following relation is established:

$$d \times \Delta d = 2n(L \times \Delta L).$$

In this case, the relation between Vo and Vp is as indicated by the dotted line Q in FIG. 2. Vp reaches its maximum value when Vo equals $V_{o2}$.

When the resonator length L changes to $(L \times \Delta L)$, the timing of superposition of the optical pulses is shifted. As a result, the intensity of the monitor light beam 18 of the laser resonator 1 is decreased, the peak voltage Vp is accordingly decreased, and the input data to one comparator 44 in the arithmetic circuit 32 is decreased, making $a_{t-1} > a_t$. In this operation, the input data to the other comparator 47 is maintained unchanged, so that $b_{t-1} = b_t$. Therefore, the processing circuit 50 controls the high voltage control circuit 39 to increase the output voltage Vo, thereby causing the piezo-electric element 14 to increase the optical path length d of the feedback system 2.

(b) When Vo is increased, the input data to the other comparator 47 in the arithmetic circuit 32 is increased, so that $b_{t-1} < b_t$. If the optical path length d is not longer than $(d \times \Delta d)$, the peak voltage Vp is increased, and the input data to the one comparator 44 in the arithmetic circuit 32 is increased so that $a_{t-1} < a_t$. As a result, Vo is further increased.

(c) Until the peak voltage Vp reaches its maximum value (or until the optical path length d exceeds $(d \times \Delta d)$), $a_t - a_{t-1} > 0$, and therefore the operation described in paragraph (b) above is repeatedly carried out, so that the output voltage Vo is gradually increased. However, when Vo exceeds $V_{o2}$, with which Vp reaches its maximum value (or d exceeds $(d \times \Delta d)$), $(a_t-a_{t-1})<0$, and therefore the input data to the one comparator 44 in the arithmetic circuit 32 is decreased. Note that $(b_t-b_{t-1})>0$ at this time instant. As a result, the processing circuit 50 controls the high voltage control circuit 39 to decrease Vo, so that Vp is converged to near Vo$_2$, with which Vp becomes its maximum value.

(d) In the case where the resonator length L is changed to $(L-\Delta L)$, it is assumed that when the optical path length d becomes $(d-\Delta d)$, the following relation is established:

$$d-\Delta d=2n\,(L-\Delta L).$$

The relation between Vo and Vp is as indicated by the one-dot chain line R in FIG. 2. Vp becomes its maximum value when Vo equals Vo$_3$. Similar to the case above, as described in paragraphs (a), (b) and (c), the arithmetic circuit 32 operates to converge Vo to near Vo$_3$, with which Vp reaches its maximum value.

In the above-described first embodiment, the arithmetic circuit operates depending on whether $(a_t-a_{t-1})$ and $(b_t-b_{t-1})$ are positive or negative. If the magnitude of variation of Vo is varied according to the magnitude of these differences, the convergence is achieved more effectively.

Also in the above-described first embodiment, the feedback system control section 3 measures the waveform 34 of the monitor light beam 18 with the SHG autocorrelation waveform measuring device 4, the peak value of the waveform 34 is converted into the corresponding peak voltage Vp, and the optical path length d of the feedback system is controlled so that the peak voltage Vp reaches its maximum value. However, the invention is not limited thereto or thereby. Any method of controlling the optical path length d of the feedback system 2 so that the monitor light beam 18 is optimized in intensity may be employed.

For example, a second embodiment of the invention is shown in FIG. 3. The waveform 34 of the monitor light beam 18 is measured with the SHG autocorrelation waveform measuring device 4, the pulse width of the waveform thus measured is converted into the corresponding pulse width voltage Vw, and the optical path length of the feedback system 2 is controlled so that Vw becomes its minimum value. To accomplish this, the input circuit 31a in the control circuit 5 is made up of a peak value hold circuit 51 that is reset by the rise of a trigger signal of the function generator 30, a $\frac{1}{2}$-multiplying circuit 52 coupled to the peak value hold circuit 51, a comparison circuit 53 for comparing the input voltage Vi corresponding to the waveform 34 to the output of the $\frac{1}{2}$-multiplying circuit 52, a time-to-voltage conversion circuit 54 coupled to the output of the comparison circuit 53 and being reset and set separately according to the presence or absence of the trigger signal of the function generator 30, and an A/D converter 37a for converting the pulse width voltage Vw outputted by the time-to-voltage conversion circuit 54 from analog to digital.

Figure 5:
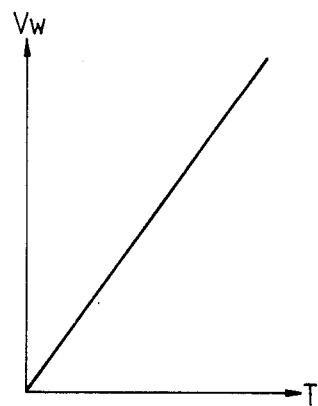
FIG. 5 is a graphical representation of the input pulse width T and the output voltage Vw of a time-to-voltage conversion circuit shown in FIG. 3.

The operation of this second embodiment of the invention will be described with reference to FIGS. 4, 5 and 6. Referring now to FIG. 4, the trigger signal, as shown in part (c), is synchronous with the triangular wave signal, part (b), which is applied to the vibrator 21 by the function generator 30. In the time-to-voltage conversion circuit 54, the input pulse width T and the output voltage Vw are proportional to each other as shown in FIG. 5, and the output voltage is maintained until application of the reset signal.

(a) When the trigger signal is provided at time instant $t_1$, the peak value hold circuit 51 is reset by the rise of the trigger signal, and the output voltage V$_1$ is set to zero (0) as shown in part (d) of FIG. 4.

(b) At time instant $t_2$, the input voltage Vi is provided as shown in part (a) of FIG. 4, V$_1$ is increased as shown in the part (d), while the output of the comparison circuit 53 is raised to "H" level as shown in part (e). In this operation, the time-to-voltage conversion circuit 54 has been reset, and therefore its output Vw is zero (0) as shown in the part (f).

(c) At time instant $t_3$, the input voltage Vi becomes lower than $\frac{1}{2}$ Vp as shown in the part (a), and the output of the comparison circuit 53 is set to "L" level as shown in part (e).

(d) At time instant $t_4$, the trigger signal is as shown in part (c), and the time-to-voltage conversion circuit 54 is set.

(e) Therefore, when the input voltage Vi exceeds $\frac{1}{2}$ Vp at the time instant $t_5$ during the set period as shown in part (a), the output of the comparison circuit 53 is raised to "H" level as shown in the part (e), and the time-to-voltage conversion circuit 54 outputs the pulse width voltage Vw as shown in part (f).

(f) At time instant $t_6$, Vi becomes lower than $\frac{1}{2}$ Vp as shown in part (a), the output of the comparison circuit 53 is set to "L" level as shown in part (e), the output Vw of the time-to-voltage conversion circuit 54 becomes a voltage corresponding to the full width at half maximum T$_1$ of the input voltage V$_i$, and the voltage is maintained.

(g) At time instant $t_7$, the trigger signal is provided as shown in the part (c). Similar to the case of paragraph (a) above, the peak value hold circuit 51 is reset by the rise of the trigger signal, so that the output voltage V$_1$ is set to zero (0) as shown in part (d). The time-to-voltage conversion circuit 54 is also reset, so that the output Vw thereof is set to zero (0) as shown in part (f).

The above-described operations are repeatedly carried out.

The input circuit 31a in the control circuit 5 operates as described in paragraphs (a) through (g), to apply the voltage Vw corresponding to the pulse width (full width at half maximum T$_1$) of the measured waveform 34 through the A/D converter 37a to an arithmetic circuit 32a. The arithmetic circuit 32a is substantially similar in arrangement to the above-described arithmetic circuit 32 (FIG. 1), and functions as described below.

Figure 6:
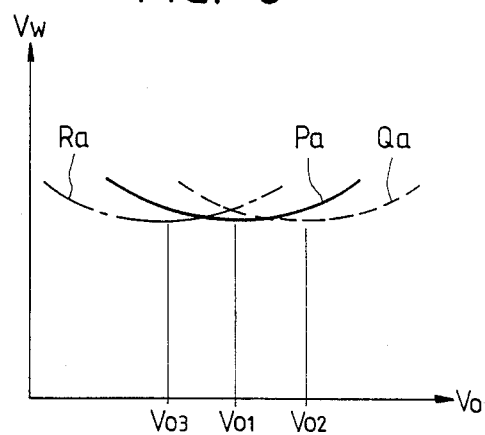
FIG. 6 is a graph showing the relationship between two voltage outputs shown in FIG. 3.

When the resonator length L of the laser resonator 1 is maintained unchanged, and the optical path length d of the feedback system 2 satisfies the equation $d=2nL$, the output voltage Vo of the control circuit 5 becomes Vo$_1$ while the pulse width voltage Vw is its minimum value, as indicated by the solid line Pa in FIG. 6. Accordingly, the laser resonator 1 outputs an optical pulse 17 that is stable, short, and high-powered, when compared with a conventional laser resonator having no feedback system.

When the resonator length L of the laser resonator 1 is changed to $L\pm\Delta L$ with temperature and so on, the optical path length d is changed to $d\pm\Delta d$, and a relation $(d\pm\Delta d)=2n\,(L\pm\Delta L)$ is established. The relationships between Vo and Vw are as indicated by the dotted line Qa and the one-dot chain line Ra in FIG. 6. The arithmetic circuit 32a functions similar to the arithmetic circuit 32 of the first embodiment. When the resonator length L is changed to L×ΔL, Vo converges to Vo₂ with which Vw becomes its minimum value as shown in the dotted line Qa (i.e., the optical path length d is set to (d×Δd)). When L is changed to L−ΔL, Vo converges to Vo₃ with which Vw becomes its minimum value as shown in the one-dot chain line Ra (i.e., the optical path length d is set to (d−Δd)).

In the feedback system control section 3 of the embodiments described above, the peak value or pulse width of the SHG autocorrelation measured waveform of the monitor light beam is converted into a voltage value, and the optical path length d is controlled so that the peak voltage Vp becomes its maximum value or the pulse width Vw becomes its minimum value. However, the invention is not limited thereto or thereby. For instance, a method may be employed in which, as indicated by the one-dot chain line in FIG. 1, the second harmonic generated by the SHG crystal 24 in the SHG autocorrelation waveform measuring device 4 is divided by a branching unit 61, the energy of the resultant branch light beam is converted into a voltage by a photo-detector 62, and the optical path length d of the feedback system 2 is controlled so that the voltage is maximized.

Figure 7:
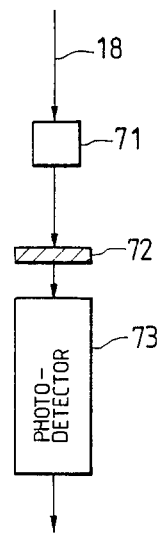
FIG. 7 is a block diagram showing essential circuit elements of a third embodiment of the highly repetitively pulsed laser stabilizing device according to the present invention.

Alternatively, a method may be employed in which the SHG autocorrelation waveform measuring device 4, as shown in FIGS. 1 or 3, is not used. Instead, as shown in FIG. 7, the monitor light beam 18 from the laser resonator 1 is applied to an SHG crystal 71, and the second harmonic generated by the SHG crystal is converted into a voltage by applying it to a photodetector 73 through a filter 72 that transmits only the second harmonic. The optical path length d of the feedback system 2 is then controlled with the control circuit 5 of FIG. 1 so that the voltage is maximized.

The filter 72 is designed so that, for instance, when the second harmonic is 600 nm in fundamental wavelength, it cuts visible rays and transmits ultraviolet rays.

The technical concept of the invention has been described above relative to a highly repetitively pulsed laser device comprising a laser resonator providing the "go" and "return" paths for an optical path, and a feedback system which returns the optical pulse emitted from the laser resonator into the latter so that it is superposed on the optical pulse in the laser resonator. However, the invention is not limited thereto or thereby. For example, the invention may be applied to a highly repetitively pulsed laser device such as a CPM ring dye laser device, having a feedback system that returns an optical pulse emitted in one direction from a circulating optical path to the latter in such a manner that the optical pulse thus returned is superposed on an optical pulse emitted in the opposite direction.

What is claimed is:

1. A highly repetitively pulsed laser stabilizing device comprising:
   laser resonator means for emitting laser pulses at a highly repetitive rate;
   feedback system means for optically delaying, by a controllable amount, an optical pulse emitted from said laser resonator means and returning said delayed optical pulse into said laser resonator means so that said delayed optical pulse is superposed on another optical pulse in said laser resonator, said feedback system means including an optical path having a controllable optical delay distance over which said optical pulse is propagated; and
   feedback system control means comprising first means for monitoring an intensity of one of said optical pulses of said laser resonator means and for providing an intensity signal representative of the optical pulse intensity, and second means, responsive to said intensity signal, for controlling the optical delay distance of said feedback means so that said monitored optical pulse is optimum in intensity.

2. A device according to claim 1, wherein said first means of said feedback system control means comprises:
   autocorrelation waveform measuring means, responsive to a waveform of said monitored optical pulse, for providing a voltage waveform representative of the waveform of said monitored optical pulse; and
   a converter for converting a peak value of said voltage waveform into an output voltage value; and
   said second means comprising a control circuit for controlling the optical delay distance of said feedback system means so that the output voltage of said converter is maximized.

3. A device according to claim 1, wherein said first means of said feedback system control means comprises:
   autocorrelation waveform measuring means, responsive to a waveform of said monitored optical pulse, for providing a voltage waveform representative of the waveform of said monitored optical pulse; and
   a converter for converting a pulse width of said voltage waveform into an output voltage value; and
   said second means comprising a control circuit for controlling the optical delay distance of said feedback system means so that the output voltage of said converter is minimized.

4. A device according to claim 1, wherein said first means of said feedback system control means comprises:
   a branching unit for dividing said monitored optical pulses into two optical pulses;
   an optical delay unit for subjecting one of the optical pulses outputted by said branching unit to a fixed optical delay, and the other of said optical pulses to a variable optical delay; and
   an SHG crystal for superposing said two optical pulses delayed by said optical delay unit on each other, to generate a second harmonic;
   said second means comprising:
   a converter for converting an intensity of the second harmonic provided by said SHG crystal into a voltage value; and
   a control circuit for controlling the optical delay distance of said feedback system means so that an output of said converter is maximized.

5. A device according to claim 1, wherein said first means of said feedback system control means comprises:
   a branching unit for dividing said monitored optical pulses into two optical pulses;
   an optical delay unit for providing equal optical delays for said two optical pulses produced by said branching unit; and
   an SHG crystal for superposing said two delayed optical pulses outputted by said optical delaying unit on each other, to generate a second harmonic;
   said second means comprising:
   a converter for converting an intensity of the second harmonic provided by said SHG crystal into a voltage value; and
   a control circuit for controlling the optical delay distance of said feedback system means so that an output of said converter is maximized.

6. A device according to claim 1, wherein said first means of said feedback system control means comprises an SHG crystal for generating a second harmonic from said monitored optical pulse;
  said second means comprising:
    a converter for converting an intensity of the second harmonic generated by said SHG crystal into a voltage value; and
    a control circuit for controlling the optical delay distance of said feedback system means so that an output of said converter is maximized.

* * * * *